United States Patent [19]

Kitai et al.

[11] 4,152,613

[45] May 1, 1979

[54] ELECTROMAGNETIC DRIVING DEVICE

[75] Inventors: Kiyoshi Kitai; Masuo Ogihara; Kozo Chimura; Nobuo Shinozaki, all of Yotsukaido, Japan

[73] Assignee: Seiko Koki Kabushiki Kaisha, Japan

[21] Appl. No.: 753,845

[22] Filed: Dec. 23, 1976

[30] Foreign Application Priority Data

Dec. 23, 1975 [JP] Japan .................. 50-173894[U]
Dec. 26, 1975 [JP] Japan .................. 50-178997[U]
Dec. 29, 1975 [JP] Japan .................. 50-159079

[51] Int. Cl.² ............................................. H02K 19/26
[52] U.S. Cl. .................................. 310/194; 310/68 R
[58] Field of Search .................. 310/40 MM, 156, 194, 310/112, 162, 114, 164, 83, 163, 103, 105, 108, 258, DIG. 6, 68, 68 D, 106, 259; 335/199; 58/23 D; 336/185, 208

[56] References Cited

U.S. PATENT DOCUMENTS

| | | | |
|---|---|---|---|
| 2,989,653 | 6/1961 | Wengel | 310/40 MM |
| 3,041,513 | 6/1962 | Reiches | 310/41 |
| 3,180,267 | 4/1965 | Bemmann | 310/68 |
| 3,248,867 | 5/1966 | Jepson | 310/162 UX |
| 3,538,362 | 11/1970 | Cheetham | 310/68 D |
| 3,747,320 | 7/1973 | Wuffray | 58/23 D |
| 3,790,833 | 2/1974 | Hasebe | 310/114 |
| 3,863,084 | 1/1975 | Hasebe | 310/156 |
| 3,873,865 | 3/1975 | Preiser | 310/164 |
| 3,909,646 | 9/1975 | Haydon | 310/83 |
| 3,912,956 | 10/1975 | Muller | 310/156 |
| 3,943,695 | 3/1976 | Bauer | 58/23 D |
| 3,999,369 | 12/1976 | de Valroger | 58/23 D |
| 4,037,400 | 7/1977 | Kitai | 58/23 D |

FOREIGN PATENT DOCUMENTS 1579650 8/1969 France ................... 58/23 D

*Primary Examiner*—R. Skudy
*Attorney, Agent, or Firm*—Robert E. Burns; Emmanuel J. Lobato; Bruce L. Adams

[57] ABSTRACT

In an electromagnetic driving device for example for an electric clock, a driving polar rotor arranged in the magnetic field of a coreless field coil drives a rotatable following polar rotor so that in their static states the poles of the rotors are shifted at a definite angle in the direction of the magnetic field of the coil. The driving polar rotor is rotatably supported within a bobbin on which the coil is wound and is retained in the bobbin by a rotor retaining part which is held in place by a printed circuit plate which controls the current flowing through the coil.

12 Claims, 5 Drawing Figures

ELECTROMAGNETIC DRIVING DEVICE

FIELD OF INVENTION

The present invention relates to an electromagnetic driving device of a small sized synchronized motor, ammeter etc. and more particularly relates to an electromagnetic driving device in which either of two polar rotors which cooperate with one another is placed within a magnetic field produced by a coreless field coil, the current to which is controlled by associated circuitry.

BACKGROUND OF INVENTION

In a prior device, the first rotor is rotatably supported by two supporting plates while the driving coil is inserted into and fixed to the supporting plates. Circuit elements controlling the current to the coil are independently combined as a unit on a printed circuit plate which is mounted on a baseplate whereupon the respective circuit elements are electrically connected with soldered lead wires. Since the circuit unit and the coil are individually set up, the procedure for checking the circuit is extremely troublesome since the circuit must be connected to an equivalent load. Also if the rotor is to be checked before the whole device is assembled this must be done by connecting a dummy circuit to the coil. Furthermore in case the checking is executed in the conventional device, especially in an electric clock and the like, it is necessary after the first rotor is assembled to insert the coil in a direction perpendicular thereto so that the assembly proceeding is painstaking and time-consuming.

SUMMARY OF INVENTION

It is an object of the present invention to eliminate the defects of prior devices as pointed out above. In accordance with the invention the driving polar rotor of an electromagnetic driving device comprising a driving polar rotor and a following rotor is rotatably housed within the bobbin of a coreless field coil by which the rotor is driven. The rotor is retained in the bobbin of the coil by a rotor retaining part which is held in place by a circuit panel which fits into the bobbin and comprises the circuitry for supplying current to the coil. The construction in accordance with the present invention permits easy assembly of the parts and also for disassembly and reassembly, for example for checking or replacement. Moreover the shaft of the driving rotor is protected from dust and other foreign substances so that an electromagnetic driving device of high reliability can be obtained.

BRIEF DESCRIPTION OF DRAWINGS

The nature objects and advantages of the invention will be more fully understood from the following description of preferred embodiments illustrated by way of example in the drawings in which.

DESCRIPTION OF PREFERRED EMBODIMENTS

Figure 1:
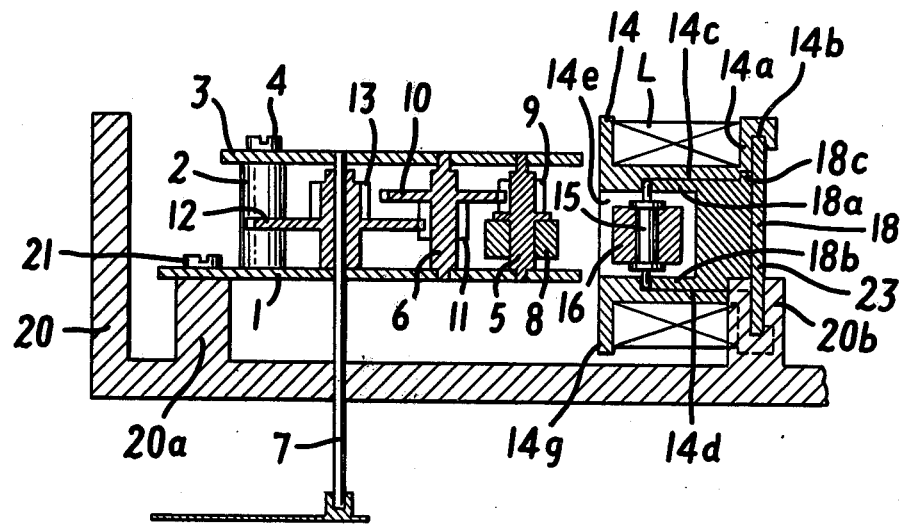
FIG. 1 is a cross-sectional view of a first embodiment of the invention.
Figure 2:
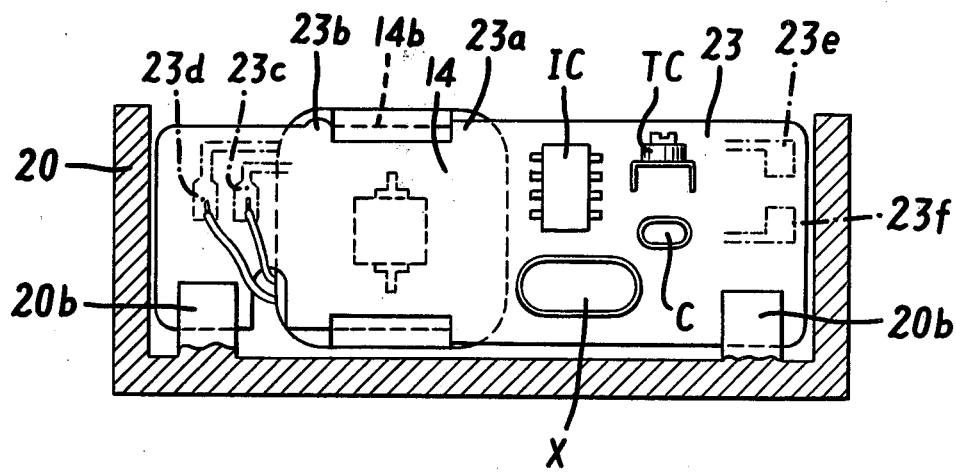
FIG. 2 is a partial side view of the embodiment shown in FIG. 1.

FIGS. 1 and 2 illustrate a first embodiment of the invention as applied to an electric clock. A lower plate 1 is fitted with a column 2 on which an upper plate 3 is secured by means of a screw 4 so as to be parallel to the lower plate 1. The lower plate 1 is fixed on a boss 20a of a case 20 by means of a screw 21. Two shafts 5 and 6 and a second-hand shaft 7 are rotatably supported by the lower plate 1 and upper plate 3. To the shaft 5 is fixed a 2nd rotor magnet 8 which is permanently magnetized to provide two poles N,S around the periphery thereof. A 1st pinion 9 is also fixed on the shaft 5. An intermediate gear wheel 10 engaged with the pinion 9 is fixed on the shaft 6 together with a 2nd pinion 11. On the second-hand shaft 7 are fixed a second unit gear wheel 12 engaged with the 2nd pinion 11 and a 3rd pinion 13 that engages with a train of gear wheels which is not shown in the drawing but is well known in the clock art.

A coil bobbin 14 on the periphery of which a coreless coil L is wound has at one end a flange 14g and at the opposite end a flange 14a on which opposite guide grooves 14b of U-shaped cross section are formed so as to face inwardly toward one another. The coil bobbin 14 is further formed to provide a central rotor-receiving cavity 14e on the upper and lower surfaces of which there are formed a 1st groove 14c and a 2nd groove 14d. A 1st rotor magnet 16 which is fixed to a rotor shaft 15 and is magnetized so as to provide poles N,S on its periphery is rotatably received in the coil bobbin 14. The rotor is retained in the bobbin 14 by a rotor retaining part 18 having on the upper and lower portions thereof hook-shaped flanges 18a and 18b which are adapted to be received in grooves 14c and 14d of the bobbin. The 1st rotor 16 and the rotor retaining part 18 are constituted in such a way that the 1st rotor 16 is inserted into the cavity 14e of the bobbin with opposite ends of the shaft 15 received in the 1st and 2nd grooves 14c and 14d of the bobbin 14. Next the rotor-retaining part 18 is inserted into the cavity 14e of the bobbin from the right as viewed in FIG. 1 with the flanges 18a and 18b fitting into the grooves 14c and 14d of the coil bobbin 14. The amount of insertion is determined by a projection 18c of the rotor-retaining part 18 striking against the end surface of the coil bobbin 14. At this moment an adequate clearance is retained between the ends of the flanges 18a and 18d and the inner ends of grooves 14c and 14d to permit free rotation of the shaft 15. Thus the 1st rotor 16 is rotatably supported within the hollow part or cavity of the bobbin of the coil.

The circuit construction for controlling the current applied to the coil L will now be described. On the right semisurface of a printed circuit plate 23 there are mounted by soldering a quartz oscillator X, a frequency divider IC, a condenser C and a trimmer condenser TC which are connected electrically to constitute a well known counter circuit. On the other hand the left semisurface of the printed plate 23 has an outer periphery of narrower width as compared with that of the right semisurface so as to provide at the boundary between the surfaces a step part 23a. At the middle part of the upper side of the left semisurface there is formed a projection 23b. The printed plate 23 thus constituted is inserted into the guide grooves 14b of the coil bobbin 14 by being slid into the grooves from the right as viewed in FIG. 2 until the step part 23a of the printed plate engages the bobbin 14. At this time the projection 23b of the printed plate is at the opposite side of the framework 14, the bobbin being sufficiently resilient to permit passage of the projection 23d through the guide groove. Thereby the bobbin 14 is fixed to the printed plate 23. Moreover it will be seen from FIG. 1 that the rotor-retaining part 18 is confined by the printed plate 23 so that it will not be pulled out of the coil bobbin 14. Thereafter the terminals of the coil L are soldered to terminal patterns 23c, 23d of the output end of the counter circuit formed on the printed plate 23. The unit comprising the printed plate 23, coil bobbin 14, coil L, 1st rotor 16 and rotor-retaining part 18 are mounted in the case 20 by end portions of the printed plate 23 being pushed into fork-formed bosses 20b projecting up from the bottom of the case 20 as seen in FIGS. 1 and 2.

The operation of the electromagnetic driving device shown in FIGS. 1 and 2 will now be described. As a motor composed of first and second rotor magnets was described in detail in our patent application Ser. No. 611,640 only a brief outline will be given here. For example when an electric current source is connected to input patterns 23e, 23f formed on the printed circuit plate 23 an alternating current is applied to the coil L each second from the electric circuit thereby producing a magnetic field to turn the 1st rotor 16 180° counterclockwise per second. This rotation is transferred to the 2nd rotor 8 which is magnetically coupled with the 1st rotor so that the 2nd rotor is made to rotate clockwise by 180° per second. This rotation is transferred to the intermediate gear wheel 10 through the first pinion 9 fixed to the second rotor 8 and is further transferred to the second-unit gear wheel 12 through the 2nd pinion 11 resulting in the rotation of the second-hand gear wheel 12 by 6° per second. The rotation of the second-hand shaft 7 is further transferred to the minute-hand and hour-hand shafts by a train of gearwheels which are constituted so as to rotate by an action generally known for a clock. Hence description of such action is here omitted.

Figure 3:
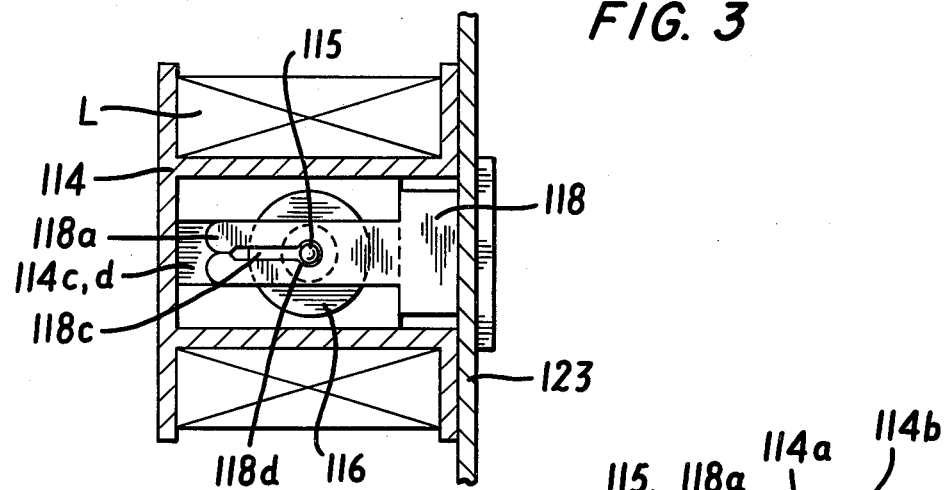
FIG. 3 is a partial plan view illustrating a second embodiment.
Figure 4:
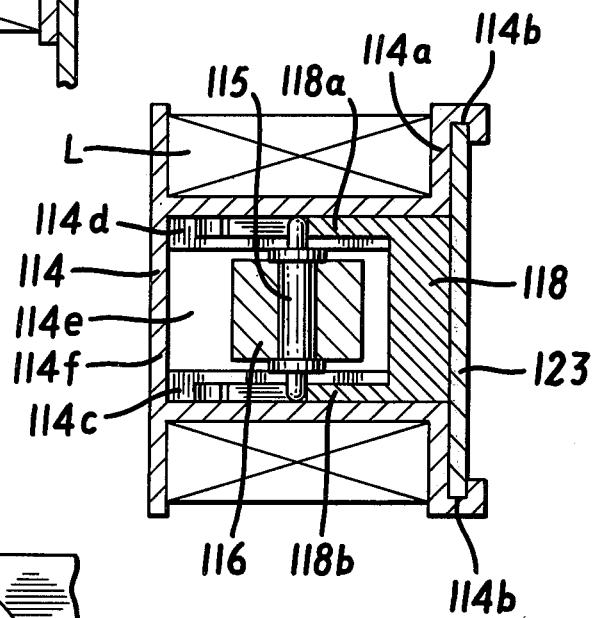
FIG. 4 is a cross-sectional view of the construction shown in FIG. 3.
Figure 5:
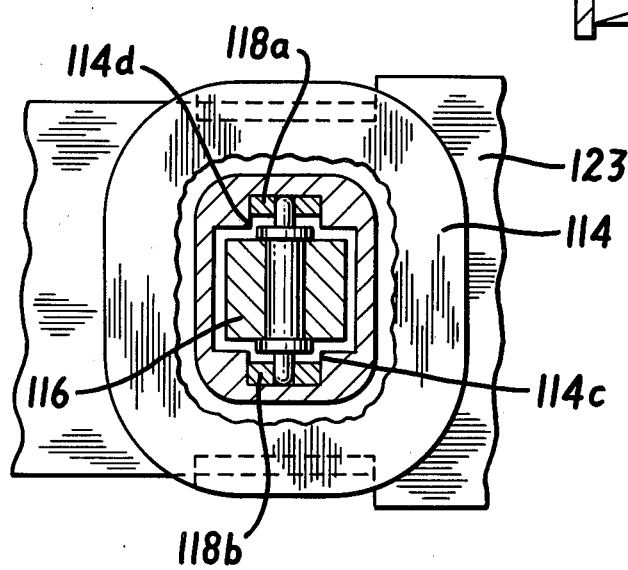
FIG. 5 is a side view of the construction shown in FIG. 3 with parts shown in section.

The second embodiment of the invention as illustrated in FIGS. 3 through 5 will now be described. Since this embodiment differs only in the method of supporting the 1st rotor, and the construction of the 2nd rotor and the train of gear wheels beyond the 2nd rotor is similar to that shown in FIGS. 1 and 2, the description is limited to that of the different parts.

As seen in FIGS. 3 and 4 a coil L is wound on the outer periphery of a coil bobbin 114 and the upper and lower parts of a flange 114a are provided with two guide grooves 114b similar to those in the first embodiment. A central cavity 114e formed in the coil bobbin 114 is closed on the left hand side as viewed in FIGS. 3 and 4 by a wall 114f. A rotor-retaining part 118 is formed with inwardly projecting flanges 118, 118b adapted to be received in guide grooves 114c and 114d of the coil bobbin 114. Each of the flanges 118a and 118b is formed with a longitudinal slot 118c at the inner end of which there is a hole 118d. The shaft 115 of the 1st rotor magnet 116 having two magnetic poles N,S on the periphery thereof is received in the holes 118d of the flanges 118a and 118b of the rotor-retaining part 118.

In assembling the parts, the 1st rotor 116 is positioned between the opposite flanges 118a, 118b of the rotor-retaining part 118 with opposite ends of the shaft 115 received in the holes 118d of the flanges. The rotor-retaining part 18 and rotor 116 are then inserted into the cavity 114e from the right hand side, as seen in FIGS. 3 and 4, the flanges 118a, 118b being guided by the grooves 114c, 114d formed in the upper and lower surfaces of the cavity 114e. At this time the flanges 118a, 118b of the rotor-retaining part 18 are deformed inwardly by compression by the grooves 114c, 114d of the coil bobbin 114 but since the amount of deformation is regulated by the fact that the slots 118c are formed at the ends with abutting portions which stroke each other the holes 118d do not become smaller than the outer diameter of the rotor shaft 115 so that the rotor shaft is freely rotatable in the holes. It will thus be seen that the shaft 115 of the first rotor 116 housed in the cavity 114e of the coil bobbin 114 is pivotally supported by the upper and lower walls of the cavity in a vertical direction while being positioned laterally by the holes 118d in the flanges of the rotor-retaining part 118.

As has been described above according to the present invention, not only is the above-mentioned object accomplished but also the shaft of the 1st rotor that is the driving source is protected from pollution by foreign substances such as dust so that an electromagnetic driving device of high reliability can be obtained. Moreover as a coil unit is elastically accommodated by the circuit unit the coil unit and circuit unit can easily be exchanged in case they become out of order so that maintenance of the driving device is readily accomplished.

As will be recognized by those skilled in the art various modifications can be made in the construction and hence the invention is in no way limited to the preferred embodiments illustrated in the drawings and herein particularly described.

What we claim is:

1. An electromagnetic driving device comprising a coil bobbin having a rotor-receiving cavity, a coreless coil wound on said coil bobbin, a polarized rotor received within said cavity and having a shaft extending axially from opposite ends of the rotor, said bobbin having at opposite sides of said cavity inwardly facing grooves extending in from an end of said bobbin and rotatably receiving opposite end portions of said shaft, a rotor-retaining member having opposite flange portions slidably received in said grooves respectively and engaging end portions of said shaft for rotatively positioning and supporting said shaft and rotor in said cavity, and control circuit means connected to said coil for periodically energizing said coil to produce rotation of said rotor.

2. An electromagnetic driving device according to claim 1, in which said opposite flange portions of said rotor-retaining member have apertures in which end portions of said rotor shaft are received to position said rotor in said cavity.

3. An electromagnetic driving device according to claim 1, in which said control circuit means comprises a circuit panel and in which said coil bobbin has at one end opposed grooves in which said circuit panel is received to attach said coil bobbin to said circuit panel.

4. An electromagnetic driving device according to claim 3, in which a rotor-retaining member is inserted in said cavity for positioning said rotor in said cavity and in which said circuit panel closes one side of said rotor cavity to retain said rotor-retaining member therein.

5. An electromagnetic driving device according to claim 3, having a case in which said circuit panel is mounted, whereby said bobbin is mounted in said case by its attachment to said circuit panel.

6. An electromagnetic driving device according to claim 1, in which said bobbin has an end portion closing one side of said rotor cavity.

7. An electromagnetic driving device comprising a case, a circuit panel mounted in said case, a coil bobbin mounted on said circuit panel and having a rotor-receiving cavity, a coreless coil wound on said bobbin, a polarized rotor received in said cavity and having a shaft extending axially from opposite ends of the rotor, said bobbin having at opposite sides of said cavity inwardly facing grooves extending in from an end of said bobbin and rotatably receiving opposite end portions of said shaft, a rotor-retaining member having opposite flange portions slidably received in said grooves respectively and engaging end portions of said shaft for rotatably positioning and supporting said shaft and rotor in said cavity, and control circuit means on said circuit panel and connected with said coil for periodically energizing said coil to produce rotation of said rotor.

8. An electromagnetic driving device according to claim 7, in which said opposite flange portions of said rotor-retaining member have apertures in which end portions of said rotor shaft are received to position said rotor in said cavity.

9. An electromagnetic driving device according to claim 7, in which said circuit panel closes one end of said cavity and thereby retains said rotor-retaining member in said cavity.

10. An electromagnetic driving device according to claim 9, in which said bobbin is provided at one end with opposed flange portions having grooves in which said circuit panel is received to attach said bobbin to said panel.

11. An electromagnetic driving device according to claim 1, in which said rotor-retaining member has a portion which connects said opposite flange portions and closes one side of said cavity.

12. An electromagnetic driving device comprising a case having a bottom and fork-form bosses projecting up from the bottom of said case, a circuit panel received by said bosses to mount said circuit panel in said case, a coil bobbin having a rotor-receiving cavity and provided at one end with opposed flange portions having grooves in which said circuit panel is received to mount said coil bobbin on said circuit panel, a coreless coil wound on said bobbin, a polarized rotor received in said cavity and having a shaft extending axially from opposite ends of the rotor, said bobbin having at opposite sides of said cavity inwardly facing grooves extending in from said end of said bobbin and rotatably receiving opposite end portions of said shaft, rotor retaining means slidably received in said grooves from said end of said bobbin and engaging end portions of said shaft to position and rotatably support said shaft and said rotor, said rotor retaining means being retained by said circuit panel, and circuit means on said circuit panel connected with said coil for energizing said coil to produce rotation of said rotor.

* * * * *